United States Patent [19]

Gabor

[11] 3,737,896

[45] June 5, 1973

[54] APPARATUS FOR RECOVERY OF RECORDED BIT INFORMATION ON A MAGNETIC RECORDING MEDIUM

[75] Inventor: Andrew Gabor, Danville, Calif.

[73] Assignee: Diablo Systems, Inc., Hayward, Calif.

[22] Filed: Oct. 27, 1971

[21] Appl. No.: 192,826

[52] U.S. Cl. ............................ 340/174.1 H, 325/324
[51] Int. Cl. ............................ G11b 5/06
[58] Field of Search ............................ 325/323, 324; 178/69 A, 88; 340/146.3 C, 146.3 Z, 146.3 R, 174.1 H, 347 DD, 347 SY

[56] References Cited

UNITED STATES PATENTS

| | | | |
|---|---|---|---|
| 3,387,221 | 6/1968 | Arberman et al. | 325/324 |
| 3,252,098 | 5/1966 | Schlaepfer | 340/174.1 H |

*Primary Examiner*—Thomas A. Robinson
*Attorney*—Flehr, Hohbach, Test, Albritton & Herbert

[57] ABSTRACT

Apparatus for the recovery of recorded data bits from a magnetic recording medium where the data has been recorded by the frequency encoding or phase encoding method. Improved noise immunity and timing margins are provided by integrating the differentiated signal and summing the differentiated signal with the integrated signal to thus provide an improved playback waveform which is processed by a gating system which discriminates between clock pulses and data pulses.

4 Claims, 15 Drawing Figures

Patented June 5, 1973 3,737,896

2 Sheets-Sheet 1

APPARATUS FOR RECOVERY OF RECORDED BIT INFORMATION ON A MAGNETIC RECORDING MEDIUM

BACKGROUND OF THE INVENTION

The present invention is directed to apparatus for the recovery of recorded bit information on a magnetic recording medium and more specifically where the information has been recorded by a phase encoding or frequency encoding methods.

The foregoing methods of recording bit information on a magnetic medium provide at least one flux transition in each bit cell to reduce the spacing between successive pulses. This method allows the use of self-clocking as described in a paper entitled "High-Density Recording on Magnetic Tape" by the present inventor and published in *Electronics*, Oct. 16, 1959.

However, such a self-clocking system must discriminate between clocking pulses which occur at the memory cell boundaries and data pulses which occur in the middle of the cell.

Such discrimination may be affected by the following factors:

1. Crowding of recorded pulses causes interference;
2. In recovering data pulses a one shot multivibrator is used which may have speed variations;
3. Noise may cause a shift of the effective cell boundary.

OBJECTS AND SUMMARY OF THE INVENTION

It is, therefore, a general object of the present invention to provide improved apparatus for the recovery of recorded bit information.

It is another object of the invention to provide apparatus as above which provides greater noise immunity and has a greater tolerance for timing errors.

In accordance with the above objects there is provided apparatus for the recovery of recorded data bits from a magnetic recording medium in which the data has been recorded by a frequency encoding or phase encoding method where data pulses occur in the center of the memory cells and clock pulses occur at cell boundaries. A playback signal having data and clock information is received. Means are provided for differentiating the playback signal and summing the playback signal with the differentiated signal. The summed signals are processed to separate the data information from the clock information.

DETAILED DESCRIPTION OF THE PREFERRED EMBODIMENTS

Figure 1:
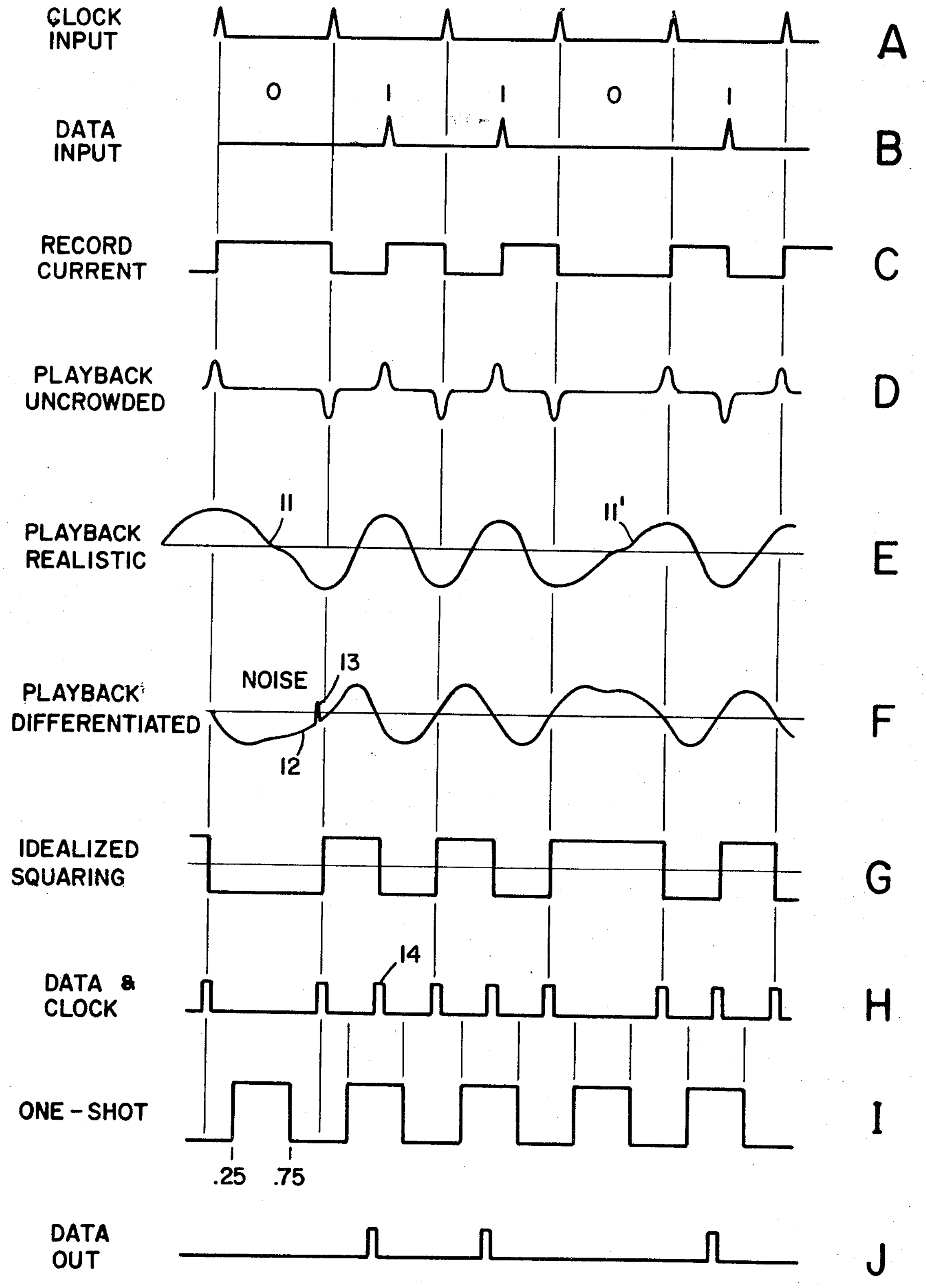
FIGS. 1A through 1J are waveforms useful in understanding the invention.

FIGS. 1A through 1J show the typical waveforms which occur in a self-clocking system as described in the foregoing *Electronics* article by the present inventor. Clock pulses shown in FIG. 1A mark the bit memory cell boundaries of the magnetic recording medium and are sent to the record amplifier continuously regardless of the data bit combination. In the preferred embodiment, it is contemplated that the magnetic memory medium will be a magnetic disk. As illustrated in FIG. 1B data pulses — a pulse for a 1 and an absent pulse for a zero — are delayed to appear in the center of the cell boundaries. The data and clock pulses are then mixed and generate a record current (FIG. 1C).

Figure 2:
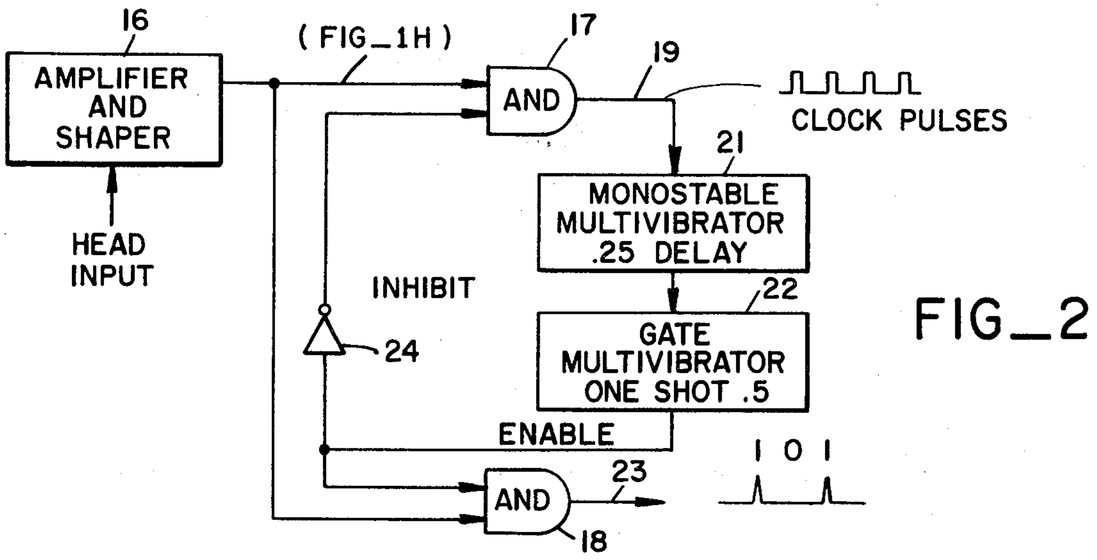
FIG. 2 is a logic block diagram embodying the invention.

The extra transitions at the cell boundaries both prevent excessive pulse crowding and also can be interpreted as clock pulses in the playback system by appropriate circuitry which is illustrated in FIG. 2.

FIG. 1D illustrates the theoretical playback waveform of the recorded information of FIG. 1B and the associated clock input of FIG. 1A if the record density is low. However, with the required higher densities, such as 2200 bits per inch, a realistic playback waveform is illustrated in FIG. 1E. Because of the resultant crowding, points of inflection 11 and 11' are produced. When the playback waveform of FIG. 1E is shaped or differentiated as illustrated in FIG. 1F, these points of inflection cause shallower slopes, for example, at 12 at the zero crossings, thus, making the system more susceptible to noise. For example, a noise spike is shown at 13 which occurs where illustrated might cause a premature indication of the zero crossing of the waveform of FIG. 1F.

Assuming the differentiated playback waveform of FIG. 1F could be ideally squared or shaped, the waveform of FIG. 1G would result which when its transitions across the zero base line are sensed would result in a data and clock output as shown in FIG. 1H which is merely the sum of FIGS. 1A and 1B. Such sensing is accomplished by RC coupling and full wave rectification of FIG. 1G. This is well known in the art. By providing proper gating by means of a one shot multivibrator (FIG. 1I) where, in essence, a data pulse, for example, at 14 is sensed from 0.25 to 0.75 of the total cell time, a data output as illustrated in FIG. 1J can be obtained. The foregoing is more fully described in the abovementioned *Electronics* article.

The specific gating logic for accomplishing the above is illustrated in FIG. 2 where the head input is coupled to an amplifier and shaping device unit 16 which will be described in detail below. The output of the amplifying shaper is a waveform similar to that of FIG. 1H. This waveform is achieved by the use of clipping the waveform of FIG. 1F to provide a waveform similar to FIG. 1G and thereafter sensing the zero transitions as discussed above to provide the waveforms of FIG. 1H.

As will be discussed below, the present invention improves the signal of FIG. 1F so that in its subsequent processing both timing errors and errors due to the normally shallower slope at 12 are minimized.

Referring specifically to the gating circuit of FIG. 2, the pulses of FIG. 1H are coupled into AND gates 17 and 18. Output line 19 of AND gate 17 produces clock pulses which trigger monostable multivibrator 21. This provides a 0.25 cell time delay as illustrated in FIG. 1I. A one shot gate multivibrator 22 provides a pulse width of 0.5 cell time. The output of multivibrator 22 enables AND gate 18 during this period to produce data pulses on line 23 as shown in FIG. 1J. At the same time the enable pulses are inverted in inverter 24 and serve as an inhibit input to AND gate 17 to prevent any data pulses from appearing on line 19. The foregoing is disclosed in the *Electronics* article.

Figure 3A:
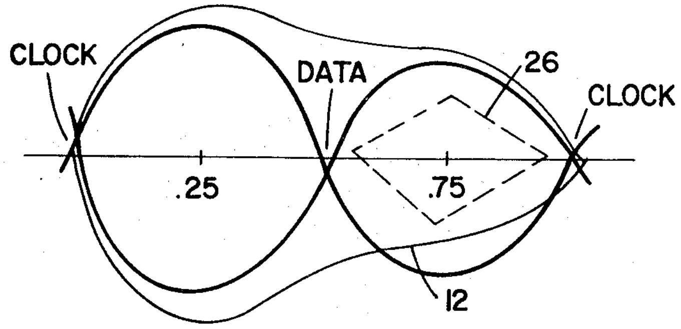
FIGS. 3A and 3B are waveforms showing the problem solved by the present invention.

The problems causes by the signal of FIG. 1F may be emphasized by the representational oscilloscope presentation of it as shown in FIG. 3A. The shallower slope caused by the point of inflection 11 (FIG. 1E), accompanying errors due to variations in the one shot multivibrator 22, and crowding and noise which may shift the effective cell boundaries because of the shallower slope (the cell boundaries being shown by the clock indications), these factors will cause the dashed window 26 to decrease both in height and width. The effective width of the window relates to timing errors and the effective height to noise immunity since a smaller height is in essence a shallower slope, thus reducing the immunity to noise signals. Thus, the window 26 is in effect a measure of the quality of the playback waveform.

Figures 3B, 4, 5:
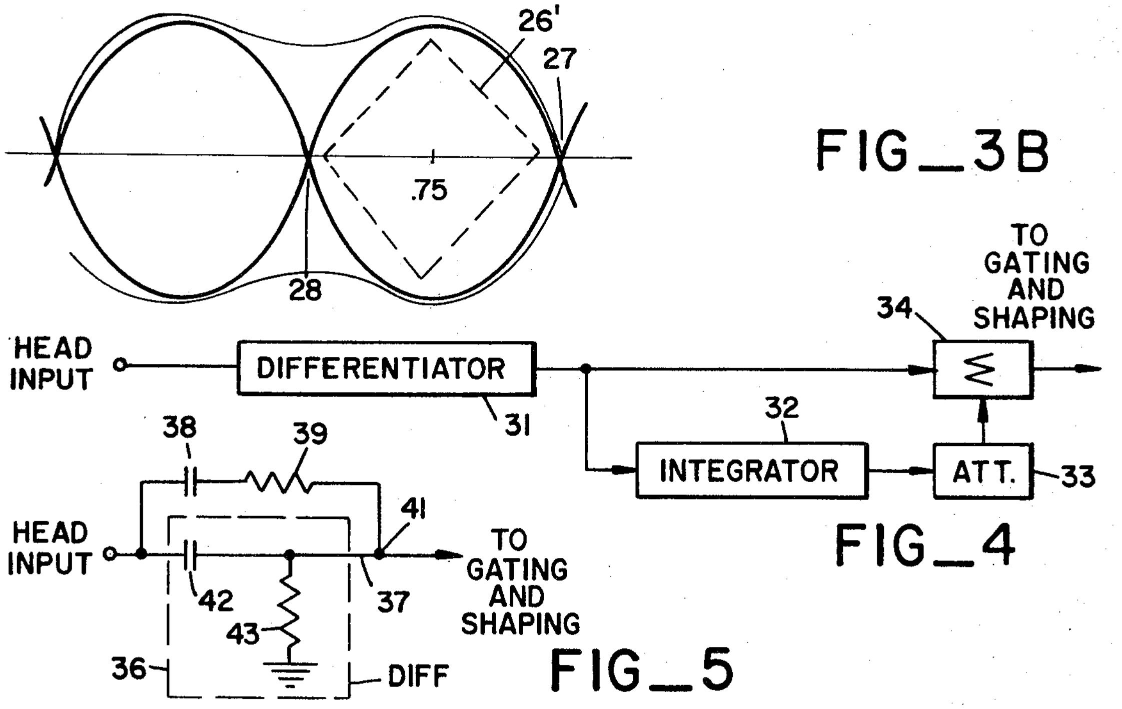
FIG. 4 is a detailed block diagram of a portion of FIG. 2.
FIG. 5 is a practical circuit of FIG. 4.

In order to approach the idealized waveform of FIG. 3B the present invention integrates the differentiated playback waveform (FIG. 1F) and sums this integrated signal with the differentiated signal to in effect correct the droop shown at 12. This produces an enlarged window 26'. This has the effect of causing a steeper slope, for example, at 27 to increase immunity to noise. At the same time the data point 28 is moved further from the 0.75 memory cell point. It is, of course, obvious that with excessive interference, etc. that the crossing point 28 might in some cases fall on the other side of the 0.75 memory cell point to cause a loss of a data pulse. In an actual oscilloscope representation of the effect of the present invention, the waveforms are very complex, and thus FIGS. 3A and 3B only remotely suggest the improvement achieved by the present invention. However, in practice, it has been found that recording density of 2200 bits per inch are easily handled in an error free manner by the improved circuit of the present invention.

This circuit is specifically illustrated in FIGS. 4 and 5. From a conceptual point of view (FIG. 4), the playback signal (FIG. 1E) from the head is differentiated by differentiator 31. The differentiated waveform is integrated by integrator 32 and attenuated by attenuator 33 and summed with the differentiated waveform at 34. The resultant waveform which is now an improved version of FIG. 1F is shaped and gated as discussed above.

As illustrated in FIG. 5, the actual preferred circuit embodiment takes advantage of the fact that the signal before it is differentiated is in fact an integrated signal. Thus, the playback signal of FIG. 1E from the playback head is coupled to the differentiator 36 to produce at 37 a differentiated playback signal. This is summed at 41 with the undifferentiated signal which occurs at the head input through a series attenuator which includes a capacitor 38 and resistor 39. This has the same effect as the circuit of FIG. 4. Differentiation circuit 36 is merely an RC section which includes capacitor 42 and a resistor 43. By adding the integrated form of the differentiated signal the droop 12 is corrected. Capacitor 38 enhances the beneficial effect of the addition. Furthermore, the enlargement of window 26 provides for greater operating margins with respect to timing.

Thus, the present invention provides an improved apparatus for the recovery of recorded bit information which provides greater noise immunity and has a greater tolerance for timing errors.

I claim:

1. Apparatus for the recovery of recorded data bits from a magnetic recording medium in which the data has been recorded by a frequency encoding or phase encoding method where data pulses occur in the center of the memory cells and clock pulses occur at cell boundaries said apparatus comprising: means for receiving a playback signal having data and clock information corresponding to said data and clock pulses; means for differentiating said playback signal; means for summing said playback signal with said differentiated signal to shift the relative location of said data information with respect to said clock information; and means for processing said summed signals to separate said data information from said clock information.

2. Apparatus as in claim 1 where said differentiating means includes a resistor-capacitor section and said summing means includes attenuating means shunting said capacitor.

3. Apparatus as in claim 1 where said attenuating means includes a resistor in series with a capacitor.

4. Apparatus for the recovery of recorded data bits from a magnetic recording medium in which the data has been recorded by a frequency encoding or phase encoding method where data pulses occur in the center of the memory cells and clock pulses occur at cell boundaries said apparatus comprising: means for receiving a playback signal having data and clock information corresponding to said data and clock pulses; means for differentiating said playback signal; means for summing said differentiated signal with said integrated signal to shift the relative location of said data information with respect to said clock information; and means for processing said summed signals to separate said data information from said clock information.

* * * * *